Dec. 8, 1959 J. G. HOFFMAN 2,916,631

AUTOMATIC THYRATRON BIAS SHIFT CIRCUIT

Filed April 19, 1944 2 Sheets-Sheet 1

INVENTOR
JOSEPH G. HOFFMAN
BY
ATTORNEY

AUTOMATIC THYRATRON BIAS SHIFT CIRCUIT

Filed April 19, 1944 2 Sheets-Sheet 2

INVENTOR
JOSEPH G. HOFFMAN
BY [signature]
ATTORNEY 2,916,631

AUTOMATIC THYRATRON BIAS SHIFT CIRCUIT

Joseph G. Hoffman, Buffalo, N.Y., assignor to the United States of America as represented by the Secretary of the Navy Application April 19, 1944, Serial No. 531,784

10 Claims. (Cl. 250—214)

(Granted under Title 35, U.S. Code (1952), sec. 266)

This invention relates to photoelectric input circuits for electronic relays such as thyratrons, and is related to my copending application, Serial No. 531,785, filed April 19, 1944, entitled "Automatic Bias Shift Circuit."

As explained in the above application, it is often desirable, in photoelectric fuze circuits and for other purposes, to change the bias of a thyratron grid as a function of photocell current. It is therefore an object to provide a circuit in which the bias will be shifted automatically to compensate for changes of light level.

Another object is to provide an automatic grid bias shift circuit employing a nonlinear resistance element in which the current passing through the element varies as a power of the voltage as in the expression $I=KV^n$, where $I$=current, $K$=a constant, $V$=voltage, and $n$ is a constant for the range of voltages to be considered.

A further object is to provide a circuit employing a plurality of such variable resistance elements in cascade so that in effect the circuit acts as an "exponent multiplier."

Additional objects will be evident from the following description taken in conjunction with the drawings forming a part hereof, in which Fig. 1 is a bias shift circuit diagram of a photocell input circuit arranged in accordance with the present invention and coupled to a "thyratron" type electronic relay;

Figure 1:
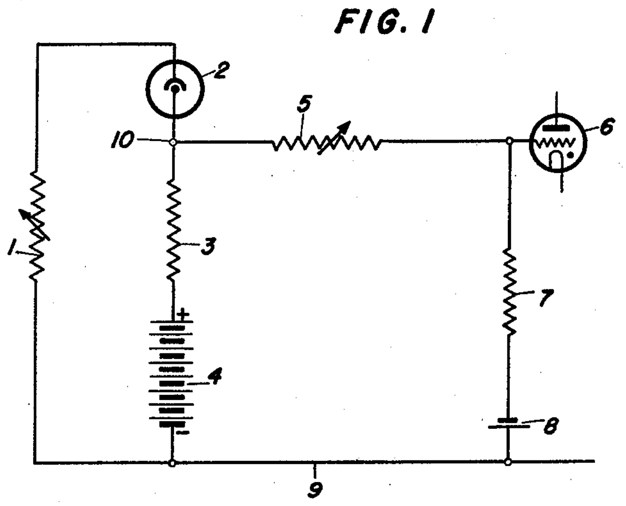

In Fig. 1, variable resistance element 1 is connected in series with photocell 2, resistance 3, and battery or other constant potential source 4, the positive terminal of which is connected to resistance 3 as shown. One terminal of variable resistance 5 is connected to the anode of photocell 2 and the other terminal is connected to the grid of "thyratron" or similar electronic relay 6. Resistance 7 is connected between the grid of tube 6, and the negative pole of battery or other potential source 8, the positive pole of which is connected to conductor 9 leading to the negative pole of battery 4 and to resistance 1.

Thyratron 6 may be connected into a circuit to be controlled in any well known manner, to act as a relay. The resistances of elements 1 and 5 decrease as the currents passing through them increase, as in the "Varistor" type of resistance.

The voltage at the grid will be equal to the voltage drop in resistor 7 minus the voltage of battery 8, the net magnitude of bias depending of course upon the voltages of batteries 4 and 8 and the values of resistances 3, 5 and 7. On account of the voltage-current characteristic of element 5, a relatively small change of applied voltage will cause a rather large change of current flowing through biasing resistor 7, the magnitude of the change depending upon the exponent of the variable resistance element 5.

In operation, as the current through photocell 2 increases, due to more light or more intense light being received, the resistance drop across element 3 will be increased. Therefore the more the photocell current increases the lower will be the potential of junction point 10 which determines the voltage applied to the circuit including resistances 5 and 7, battery 8, conductor 9, battery 4, and resistance 3. As the current through element 7 decreases the voltage drop across it decreases and therefore, on account of battery 8, the grid of thyratron 6 is biased to be relatively more negative. In like manner, but in opposite sense, the grid is biased more positively as the photocell current is decreased.

Figure 2:
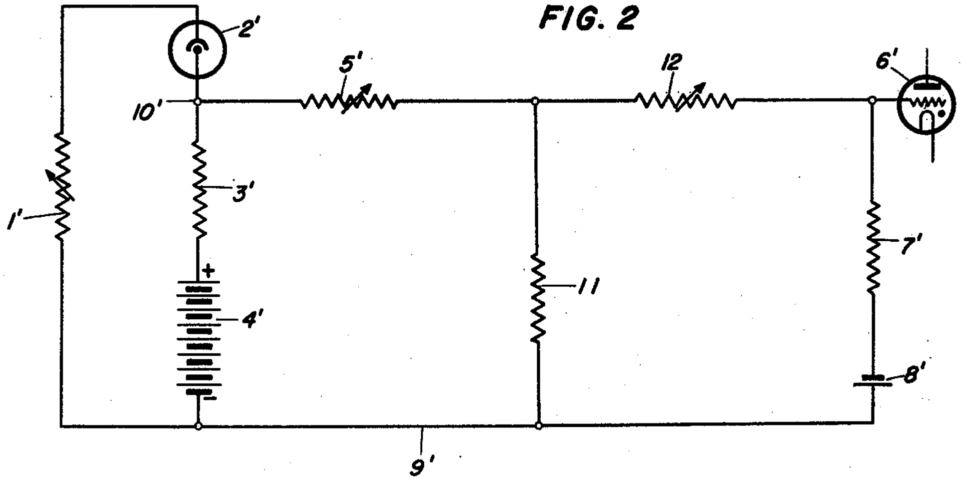
Fig. 2 is a circuit diagram of a somewhat modified form of the invention in which variable resistance elements are connected in cascade in the grid circuit of the electronic relay.

In view of the fact that it is difficult to obtain a variable resistance element with an exponent sufficiently high to produce an adequately large change in grid bias over the desired range of photocell current (0–15 microamperes for certain types of photoelectric fuzes), I have devised the "exponent multiplier" circuit illustrated in Fig. 2. This circuit is similar to that shown in Fig. 1 (equivalent parts being designated by like reference characters, distinguished by the addition of prime exponents). An additional variable resistance element 12 is connected between element 5' and the grid, and resistance 11 is connected between the junction of elements 5' and 12 and conductor 9'.

This circuit is in effect a cascade arrangement. Potential fluctuations across resistance 11, magnified as a result of the variable resistance characteristic of element 5', are applied to the circuit including variable resistance element 12, resistance 7', and battery 8', so that the grid biasing potentials are further magnified, as described in connection with Fig. 1. This arrangement produces a greater change of current through grid biasing resistor 7', than the circuit of Fig. 1, but a disadvantage is that the magnitude of the current in the resistor is much smaller than in the previous case. In order to get the greatest possible change, element 12 should have as high an exponent as possible, even though this might necessitate the use of an element of higher resistance.

As one practical illustration of values of various components found to be workable in fuze circuits of the character described, element 5 or 5' can have a resistance of 120 megohms, battery 8 or 8' a voltage of 6, and element 7 or 7' a resistance of 2 megohms. The thyratron grid bias in this case varies from −1 volt to −5 volts, with photocell currents varying from zero to 10 $\mu$ a., with the potential of battery 4, 4' approximately 135 volts. The exponents of variable resistances usually obtainable vary from approximately three to eight in value.

Figures 3, 4, 5:
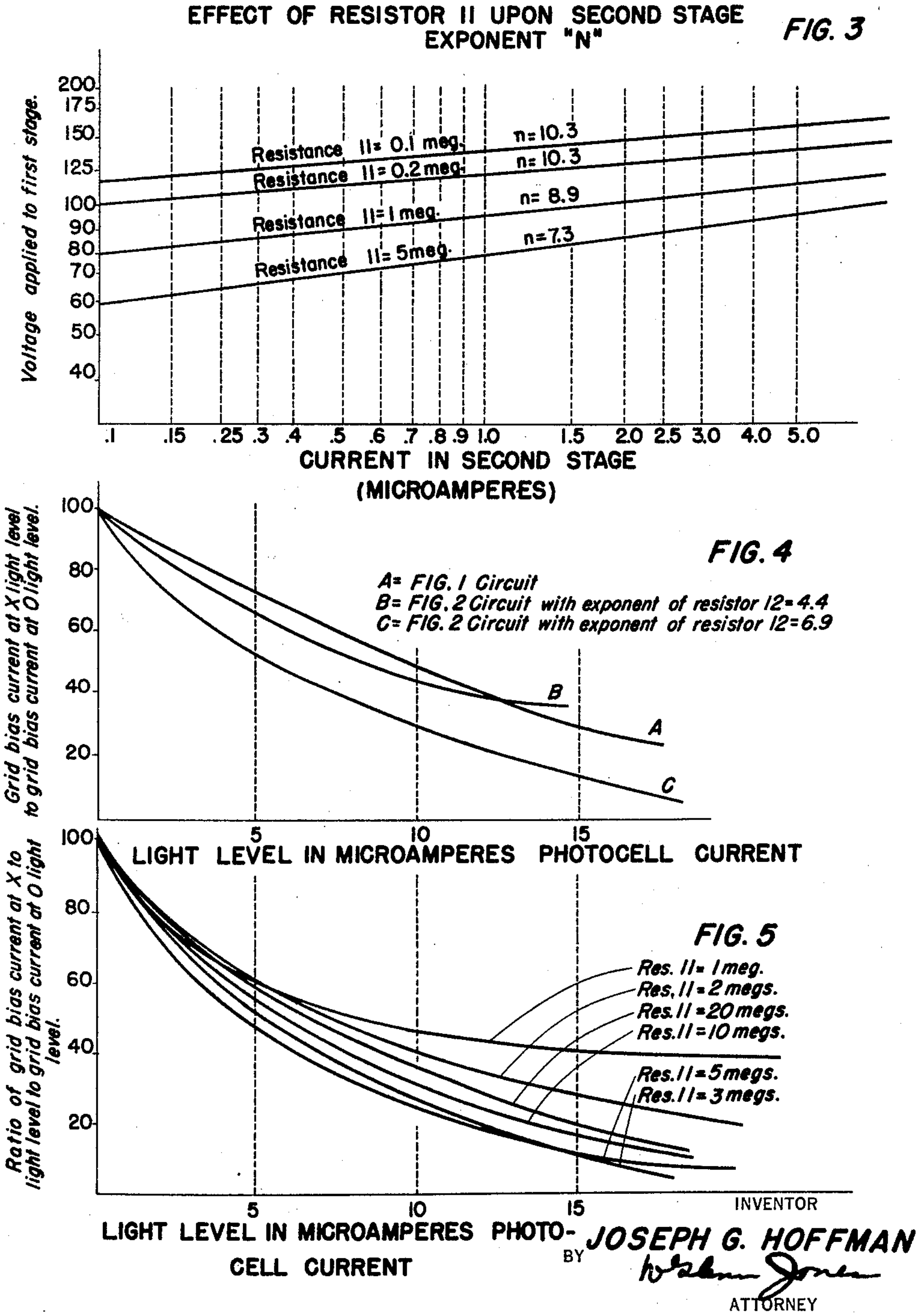
Fig. 3 is a graph showing a series of curves illustrating the variation of exponent of the variable resistance element for different values of coupling resistors; second stage grid biasing current being plotted against applied voltage at the first stage.
Fig. 4 shows curves of the ratio of grid bias current at a given light level to grid bias current at zero light level, expressed as percent, plotted against light level—for single and two stage circuits.
Fig. 5 shows curves similar to those of Fig. 4, for a two stage circuit as in Fig. 2, and for various values of interstage coupling resistor.

The effects of the resistor 11 upon the second stage exponent of the two stage cascade circuit of Fig. 2 are shown in Fig. 3. It will be seen that the second stage current is an exponential function of the applied voltages for the values of resistors used and for the range of voltage and current employed. The actual second stage exponent $n$ is 10.3 when the resistance of element 11 is 0.1 megohm. The product of the exponents of the two cascaded systems is 19.2 under the same conditions.

In Fig. 4, curve A shows the percentage of grid bias current at various light levels with respect to grid bias current at zero light level, as a function of light level. Curves B and C show that element 12 should have a high exponent. Curve C, which is for a variable resistance element of exponent 6.9 has a considerably greater slope in the important region 0 to 7 $\mu$ a. than curve B which is for an element of exponent 4.4. The slope is important because it is proportional to the rate of change of grid biasing current with respect to light level. It is obvious that curves B and C have more slope than curve A which is for the single variable resistance circuit as shown in Fig. 1.

I have found that in order to get a sufficiently large current through the bias resistor, the element 5 should have a low resistance, even though this involves a sacrifice of exponent.

The effects of various values of resistance 11 upon the change of current through resistor 7 are shown in the curves of Fig. 5 which are self-explanatory.

While I have shown and described preferred embodiments of my invention, it is to be understood that many other variations based upon the general principles I have disclosed are easily possible.

The invention herein described may be manufactured and used by or for the Government of the United States of America for governmental purposes without the payment of any royalties thereon or therefor.

I claim:

1. A photoelectric relay comprising in combination with an electronic relay tube having a grid, photoelectric input means connected to said grid, comprising a photocell circuit, a photocell, a source of current and a nonlinear resistor in said photocell circuit, and means including a second nonlinear resistor connected to said grid and to said photocell circuit to vary the bias imposed on said grid in a direction to oppose passage of current through the electronic relay tube in response to increased current flow in the photocell circuit.

2. In a photoelectric relay as set forth in claim 1 a load resistor in said photocell circuit in series with said nonlinear resistor, source of current and photocell, said second nonlinear resistor being connected to said photocell circuit at a point between the load resistor and said first-mentioned nonlinear resistor.

3. In a photoelectric relay as set forth in claim 1, additional biasing means connected to said grid and to the photocell circuit including a second source of current constantly imposing on the grid a bias opposing current flow through the electronic relay tube.

4. A photoelectric relay as set forth in claim 1 in which said source of current and said grid are arranged in a closed grid circuit connected to the photocell circuit, the portion of the photocell circuit in which said photocell is incorporated being distinct from the grid circuit, whereby when the photocell is illuminated current from said source may flow through the photocell circuit independently of the grid circuit, while interruption of the photocell circuit results in imposition of a pulse upon said grid.

5. Electronic relay means comprising a thermionic tube having a grid circuit, a closed input circuit coupled to said grid circuit, a source of current in said input circuit and also connected to said grid circuit, and control means in the input circuit but not incorporated in the grid circuit and arranged to interrupt current flow in the input circuit without disturbing the connection between said source and the grid circuit.

6. Means as set forth in claim 5 in which said control means comprises a photocell.

7. Means as set forth in claim 5 in which said control means comprises a photocell, a load in series with said current source and forming a part of both of said circuits, and a grid leak and a second source of current in said grid circuit, said two current sources being of opposite polarity with respect to the grid.

8. Means as set forth in claim 5 in which said control means comprises a photocell, said grid circuit comprising a plurality of nonlinear resistors connected in cascade.

9. Means as set forth in claim 5 in which said control means comprises a photocell, said grid circuit comprising a plurality of nonlinear resistors connected in series between said input circuit and grid, and biasing resistors connected to said grid and to the junction between said nonlinear resistors.

10. Means as set forth in claim 5 in which said control means comprises a photocell, said input circuit and grid circuit comprising interconnected shunt circuits having a portion in common, said current source being arranged in said common portion, a plurality of nonlinear resistors connected in series, forming one side of said shunt circuit, and one thereof being connected to said grid, and a plurality of resistors connected across said grid circuit and shunting said source of current.

References Cited in the file of this patent

UNITED STATES PATENTS

| | | |
|---|---|---|
| 1,692,904 | Potter | Nov. 27, 1928 |
| 1,783,321 | Weaver | Dec. 2, 1930 |
| 1,895,531 | Weaver | Jan. 31, 1933 |
| 1,899,712 | Nakken | Feb. 28, 1933 |